United States Patent
Takubo (10) Patent No.: US 12,386,553 B2
(45) Date of Patent: Aug. 12, 2025

(54) MEMORY CONTROLLER AND FLASH MEMORY SYSTEM

(71) Applicant: TDK CORPORATION, Tokyo (JP)

(72) Inventor: Kenichi Takubo, Tokyo (JP)

(73) Assignee: TDK CORPORATION, Tokyo (JP)

( * ) Notice: Subject to any disclaimer, the term of this patent is extended or adjusted under 35 U.S.C. 154(b) by 280 days.

(21) Appl. No.: 18/021,838

(22) PCT Filed: Nov. 12, 2021

(86) PCT No.: PCT/JP2021/041686
§ 371 (c)(1),
(2) Date: Feb. 17, 2023

(87) PCT Pub. No.: WO2023/084729
PCT Pub. Date: May 19, 2023

(65) Prior Publication Data
US 2023/0297276 A1 Sep. 21, 2023

(51) Int. Cl.
*G06F 3/06* (2006.01)
(52) U.S. Cl.
CPC .......... *G06F 3/0658* (2013.01); *G06F 3/0619* (2013.01); *G06F 3/0679* (2013.01)
(58) Field of Classification Search
CPC ..... G06F 3/0658; G06F 3/0619; G06F 3/0679
See application file for complete search history.

(56) References Cited

U.S. PATENT DOCUMENTS

| 11,049,565 B2 | 6/2021 | Cowles et al. |
| 11,275,651 B2 | 3/2022 | Takubo |
| 11,410,741 B2 | 8/2022 | Takubo |
| 2015/0100729 A1* | 4/2015 | Kong ............... G06F 3/0625 711/114 |
| 2021/0397517 A1* | 12/2021 | Sharma ............ G06F 3/0631 |

FOREIGN PATENT DOCUMENTS

| JP | 2006-18373 A | 1/2006 |
| JP | 2021-125089 A | 8/2021 |
| JP | 2021-125090 A | 8/2021 |
| JP | 2021-520021 A | 8/2021 |

\* cited by examiner

*Primary Examiner* — Kenneth M Lo
*Assistant Examiner* — Han V Doan
(74) *Attorney, Agent, or Firm* — Oliff PLC

(57) ABSTRACT

A memory controller includes a layout setter and an access processor. The layout setter performs setting of data placement to be applied to multiple channels at the time of parallel data transfer between the memory controller and the flash memory using the multiple channels. The access processor performs, in performing access processing for data on the flash memory, the parallel data transfer to/from the flash memory using the data placement for the multiple channels set by the layout setter. In placing user data and parity data included in the data, the layout setter sets the data placement for the multiple channels to allow, in the multiple channels, second placement regions where the parity data are placed to be collectively placed forward or backward relative to first placement regions where the user data are placed, along an order of access at the time of the parallel data transfer.

12 Claims, 9 Drawing Sheets

EXAMPLE

MEMORY CONTROLLER AND FLASH MEMORY SYSTEM

TECHNICAL FIELD

The disclosure relates to a memory controller and a flash memory system.

BACKGROUND ART

A memory controller that controls a nonvolatile memory such as a flash memory, and a memory system including such a memory controller and the nonvolatile memory, such as a flash memory system, have been proposed (see Patent Literature 1, for example).

CITATION LIST

Patent Literature

Patent Literature 1: Japanese Unexamined Patent Application Publication (Published Japanese Translation of PCT Application) No. JP2021-520021

SUMMARY

A memory controller according to an embodiment of the disclosure is configured to control a flash memory. The memory controller includes a layout setter and an access processor. The layout setter is configured to perform setting of data placement that is to be applied to multiple channels at the time of parallel data transfer to be performed between the memory controller and the flash memory using the multiple channels. The access processor is configured to perform, in performing access processing for data on the flash memory, the parallel data transfer to and from the flash memory using the data placement for the multiple channels that is set by the layout setter. The layout setter is configured to, in placing each of user data and parity data included in the data, set the data placement for the multiple channels to allow, in the multiple channels, second placement regions to be collectively placed forward or backward relative to first placement regions along an order of access at the time of the parallel data transfer, the first placement regions each being a region where the user data is to be placed, the second placement regions each being a region where the parity data is to be placed.

A flash memory system according to an embodiment of the disclosure includes a memory controller configured to control a flash memory, and the flash memory. The memory controller includes a layout setter and an access processor. The layout setter is configured to perform setting of data placement that is to be applied to multiple channels at the time of parallel data transfer to be performed between the memory controller and the flash memory using the multiple channels. The access processor is configured to perform, in performing access processing for data on the flash memory, the parallel data transfer to and from the flash memory using the data placement for the multiple channels that is set by the layout setter. The layout setter is configured to, in placing each of user data and parity data included in the data, set the data placement for the multiple channels to allow, in the multiple channels, second placement regions to be collectively placed forward or backward relative to first placement regions along an order of access at the time of the parallel data transfer, the first placement regions each being a region where the user data is to be placed, the second placement regions each being a region where the parity data is to be placed.

A memory controller according to an embodiment of the disclosure is configured to control a flash memory. The memory controller includes a control circuit. The control circuit is configured to perform setting of data placement that is to be applied to multiple channels at the time of parallel data transfer to be performed between the memory controller and the flash memory using the multiple channels, and to perform, in performing access processing for data on the flash memory, the parallel data transfer to and from the flash memory using the data placement for the multiple channels that is set by the control circuit. The control circuit is configured to, in placing each of user data and parity data included in the data, set the data placement for the multiple channels to allow, in the multiple channels, second placement regions to be collectively placed forward or backward relative to first placement regions along an order of access at the time of the parallel data transfer, the first placement regions each being a region where the user data is to be placed, the second placement regions each being a region where the parity data is to be placed.

A flash memory system according to an embodiment of the disclosure includes a memory controller configured to control a flash memory, and the flash memory. The memory controller includes a control circuit. The control circuit is configured to perform setting of data placement that is to be applied to multiple channels at the time of parallel data transfer to be performed between the memory controller and the flash memory using the multiple channels, and to perform, in performing access processing for data on the flash memory, the parallel data transfer to and from the flash memory using the data placement for the multiple channels that is set by the control circuit. The control circuit is configured to, in placing each of user data and parity data included in the data, set the data placement for the multiple channels to allow, in the multiple channels, second placement regions to be collectively placed forward or backward relative to first placement regions along an order of access at the time of the parallel data transfer, the first placement regions each being a region where the user data is to be placed, the second placement regions each being a region where the parity data is to be placed.

DETAILED DESCRIPTION

It is typically desired that such a memory controller and the like achieve enhanced data transfer speed with a simple configuration. It is desirable to provide a memory controller and a flash memory system that each make it possible to enhance data transfer speed with a simple configuration.

A description is given in detail below of some example embodiments of the disclosure with reference to the drawings. The description is given in the following order.
 1. Example Embodiment (an example of placement of user data and parity data in performing parallel data transfer)
 2. Modification Examples 1. Example Embodiment

[Schematic Configuration]

Figure 1:
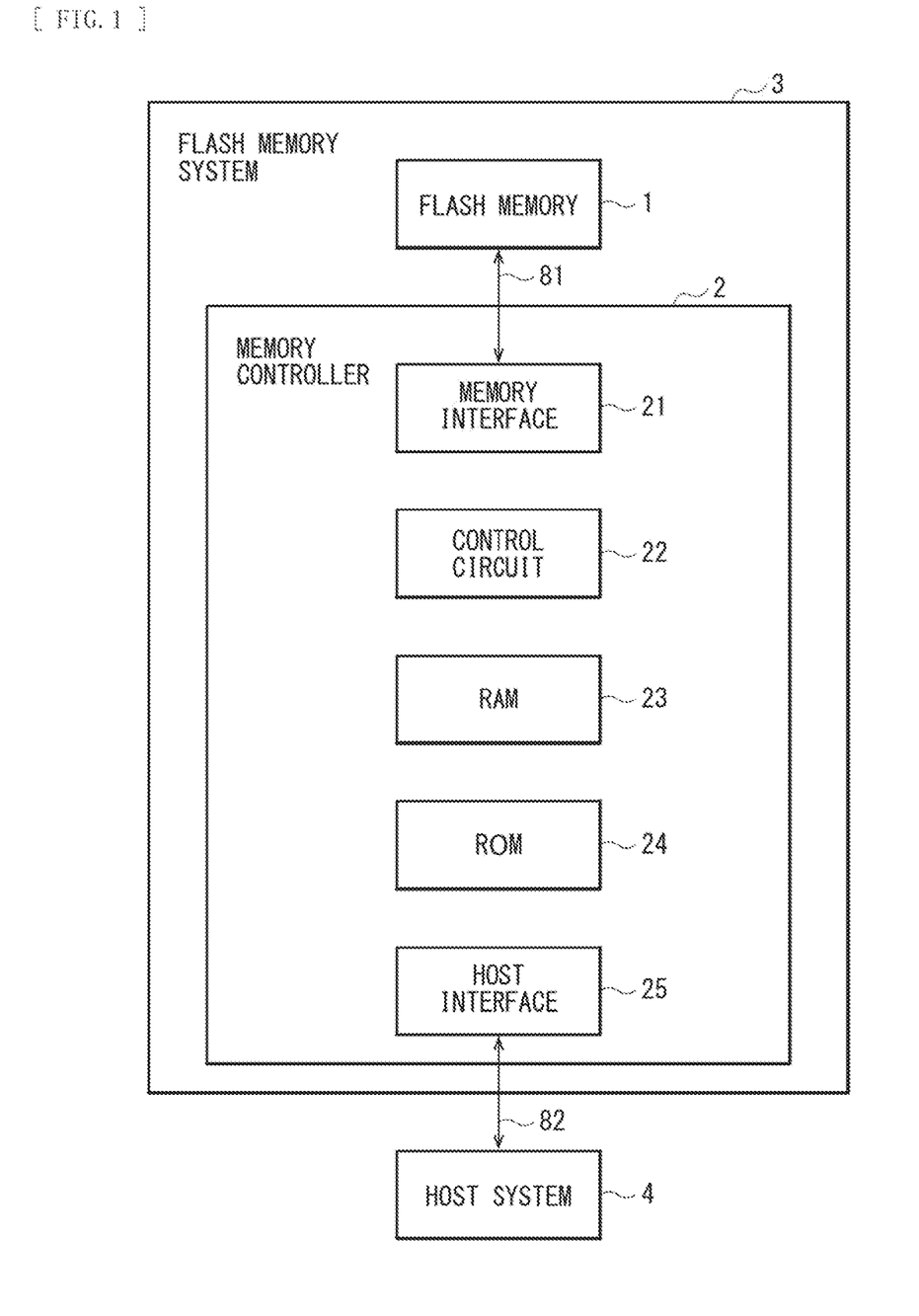
FIG. 1 is a block diagram illustrating a schematic configuration example of systems including a flash memory system according to one example embodiment of the disclosure.

FIG. 1 illustrates a schematic configuration example of a flash memory system (a flash memory system 3) according to an example embodiment of the disclosure, together with an external host system 4, in a block diagram. The flash memory system 3 is a system corresponding to, for example, a solid state drive (SSD), an embedded multimedia card (eMMC), or the like.

As illustrated in FIG. 1, the flash memory system 3 includes a flash memory 1 and a memory controller 2. The host system 4 and the memory controller 2 (a host interface 25 to be described later) are coupled to each other via an external bus 82. The memory controller 2 (a memory interface 21 to be described later) and the flash memory 1 are coupled to each other via an internal bus 81.

(A. Host System 4)

The host system 4 is a host system that uses the flash memory system 3 as a secondary storage device. The host system 4 includes a central processing unit (CPU), a companion chip, and other components. The CPU controls operation of the entire host system 4. The companion chip transmits and receives various pieces of data to and from the flash memory system 3. Such a host system 4 is, for example, an information processor such as a personal computer (PC) or a digital still camera.

Further, the host system 4 supplies a predetermined command to the flash memory system 3 to thereby instruct the flash memory system 3 to execute various kinds of processing. Specifically, the predetermined command is a command for the memory controller 2 in the flash memory system 3 to instruct the flash memory 1 to execute various kinds of processing. Thus, the flash memory 1 performs various kinds of operations in accordance with the command supplied from the memory controller 2.

(B. Flash Memory 1)

The flash memory 1 is a nonvolatile memory, and includes one or more flash memory chips (chips). For example, the flash memory 1 is a NAND flash memory. With the NAND flash memory, access processing (write processing or read processing) for data is performed in page units, and erasure processing (batch erasure) for data is performed in block units. Each block includes multiple pages.

In this connection, the page and the block of the flash memory 1 are typically also referred to as a physical page and a physical block, respectively. This is for distinction from a logical page and a logical block which are units to be used by the host system 4 in handling data.

Specifically, each physical block includes, for example, 64, 128, or 256 physical pages. Further, each physical page includes, for example, 4, 8, or 16 sectors (physical sectors). Each physical sector is a region allocated to store data of 512 bytes (data of one sector).

The flash memory 1 includes a register, and a memory cell array in which multiple memory cells are aligned. The memory cell array includes multiple memory cell groups and a word line. Each of the memory cell groups includes multiple ones of the memory cells coupled in series. The word line is provided to select a particular one of the memory cells from the memory cell group. Write processing (a write process) for data from the register into the selected memory cell or read processing (a read process) for data from the selected memory cell to the register is performed between the selected memory cell and the register via the word line.

(C. Memory Controller 2)

The memory controller 2 controls the flash memory 1 in accordance with a command (the command described above) from the host system 4. Specifically, for example, upon receiving a write request from the host system 4, the memory controller 2 writes data received from the host system 4 into the flash memory 1. Further, for example, upon receiving a read request from the host system 4, the memory controller 2 reads data from the flash memory 1 and transmits the data to the host system 4.

In the present example embodiment, as will be described in detail later, parallel data transfer using multiple channels is performed between the memory controller 2 and the flash memory 1, and between the memory controller 2 and the host system 4.

As illustrated in FIG. 1, for example, the memory controller 2 includes components including, without limitation, the memory interface 21, a control circuit 22, a random access memory (RAM) 23, a read-only memory (ROM) 24, and the host interface 25.

The memory interface 21 is an interface used to communicate with the flash memory 1. The memory interface 21 is an interface conforming to, for example, the open NAND flash interface (ONFI) standard.

The control circuit 22 is a circuit that transmits and receives data to and from the host system 4 via the host interface 25 and controls the flash memory 1 via the memory interface 21. The control circuit 22 includes a central processing unit (CPU) and a peripheral circuit. The CPU reads a control program stored in the ROM 24 and executes the control program. This enables respective functions of functional units described later to be implemented.

The RAM 23 is a part that temporarily holds work data necessary for the CPU to execute the control program described above, data received from the host system 4, data read from the flash memory 1, and other data. In other words, the RAM 23 serves as a buffer memory. The RAM 23 is, for example, a volatile memory that is accessible at high speed, such as a static random access memory (SRAM) or a dynamic random access memory (DRAM).

The ROM 24 is a part that holds the control program described above. The ROM 24 is, for example, a nonvolatile memory such as a programmable read-only memory (PROM) or an electrically erasable programmable read-only memory (EEPROM).

The host interface 25 is an interface used to communicate with the host system 4. The host interface 25 is, for example, an interface conforming to the serial advanced technology attachment (SATA) standard or an interface conforming to the non-volatile memory express (NVMe) standard.

[Detailed Configuration of Control Circuit 22]

Figure 2:
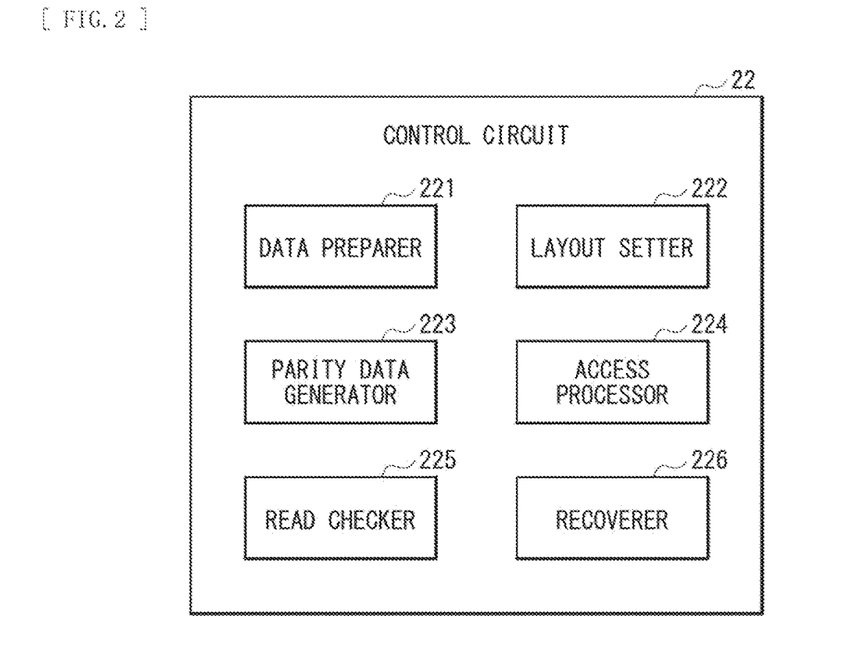
FIG. 2 is a block diagram illustrating a detailed configuration example of a control circuit illustrated in FIG. 1.

Next, a detailed configuration example of the foregoing control circuit 22 will be described with reference to FIG. 2. FIG. 2 illustrates the detailed configuration example of the control circuit 22 in a block diagram. Specifically, FIG. 2 illustrates various functional units of the control circuit 22 implemented by the CPU of the control circuit 22 reading and executing the control program stored in the ROM 24, as functional blocks.

As such a functional configuration, as illustrated in FIG. 2, the control circuit 22 includes a data preparer 221, a layout setter 222, a parity data generator 223, an access processor 224, a read checker 225, and a recoverer 226.

The data preparer 221 prepares data to be stored in each of the foregoing blocks in page units. The data in page units are sequentially written into respective pages in the block by the access processor 224 to be described later. The data preparer 221 prepares the data to be stored in page units by, for example, partitioning data for which a write request has been issued by the host system 4, i.e., data received from the host system 4, into pages and storing the partitioned data in the RAM 23. Further, in a case where there arises data to be newly written into the flash memory 1 for convenience of management, although not supplied from the host system 4, the data preparer 221 prepares the relevant data in page units.

Figure 3:
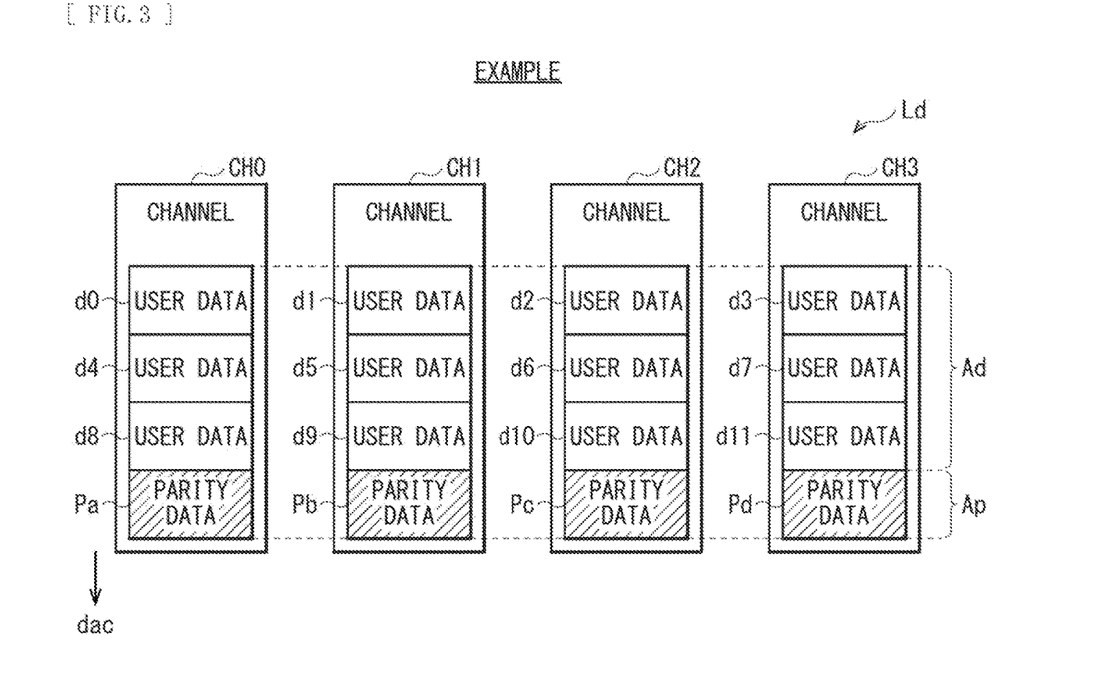
FIG. 3 is a schematic diagram illustrating a configuration example of data placement in each channel according to Example.

The layout setter 222 performs predetermined layout setting for each data at the time of the foregoing parallel data transfer, i.e., the parallel data transfer between the memory controller 2 and the flash memory 1 or the host system 4 using multiple channels. Specifically, the layout setter 222 performs setting of data placement that is to be applied to the multiple channels at the time of such parallel data transfer. Details of a data placement configuration in each of the channels set by the layout setter 222 will be described later (FIG. 3).

Figure 14:
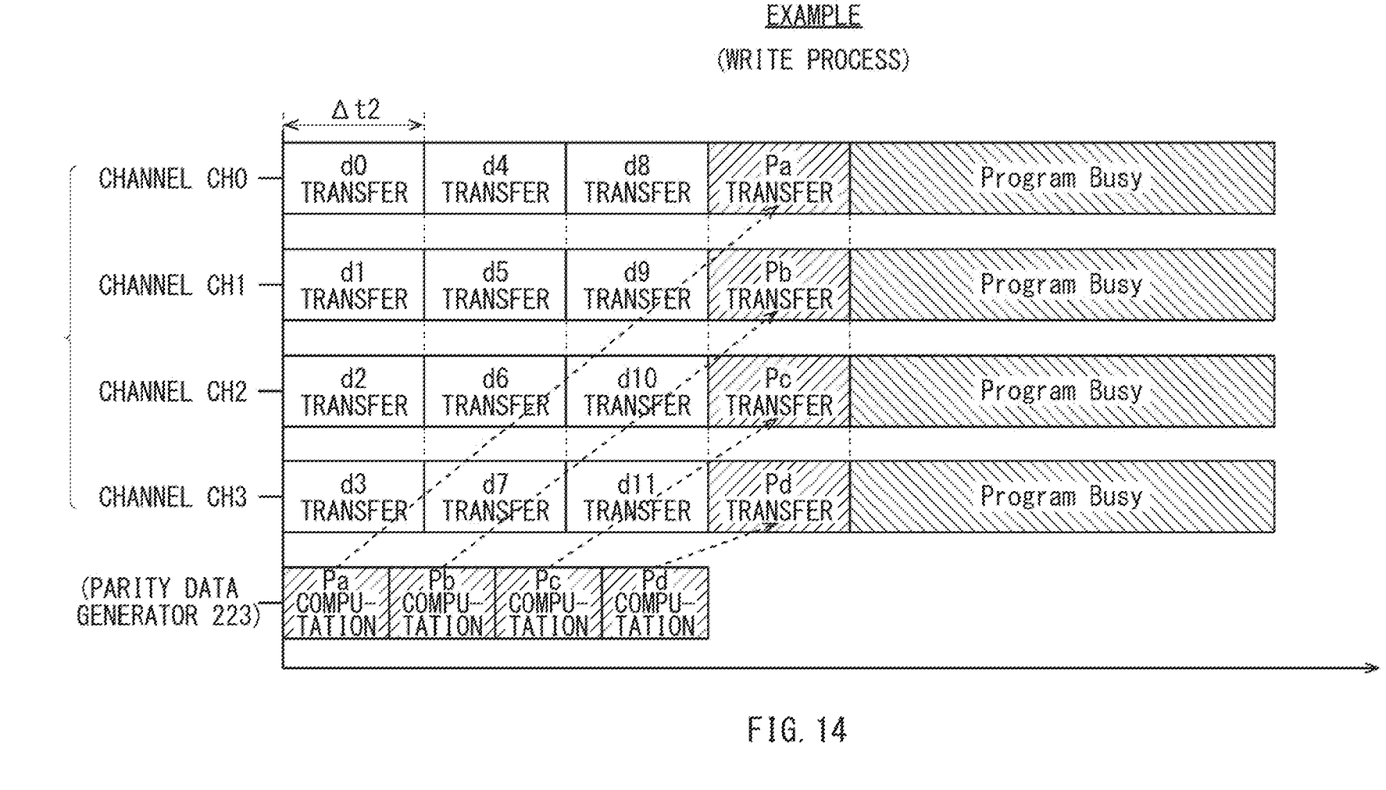
FIG. 14 is a schematic diagram illustrating an operation example of parallel data transfer during a write process according to Example.

The parity data generator 223 determines parity across pieces of data (user data) to be written into pages in each block to thereby generate parity data which is redundant data. In other words, the parity data generator 223 generates parity data on the basis of such pieces of user data. Specifically, the parity data generator 223 generates, as the parity data, horizontal parity obtainable by computing an XOR of the pieces of user data to be written into the pages in each block. Alternatively, the parity data generator 223 may generate, for example, Galois parity obtainable by a Galois field computation or parity obtainable by any other computation as the parity data. The technique by which the parity data generator 223 generates the parity data will be described in detail later (FIGS. 3 and 14).

Figure 12:
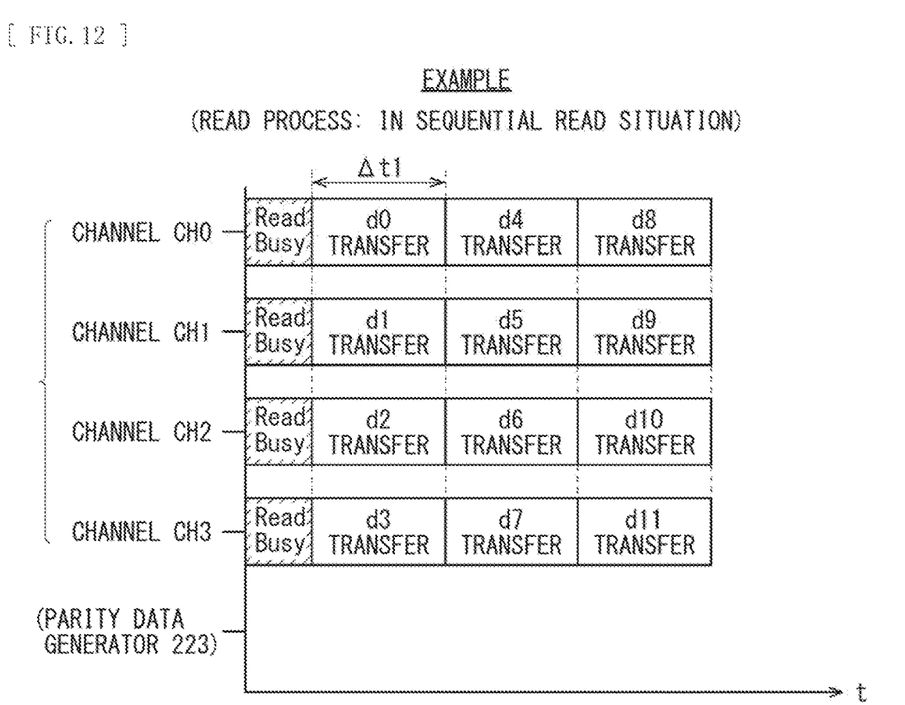
FIG. 12 is a schematic diagram illustrating an operation example of parallel data transfer during a read process (in a sequential read situation) according to Example.
Figure 13:
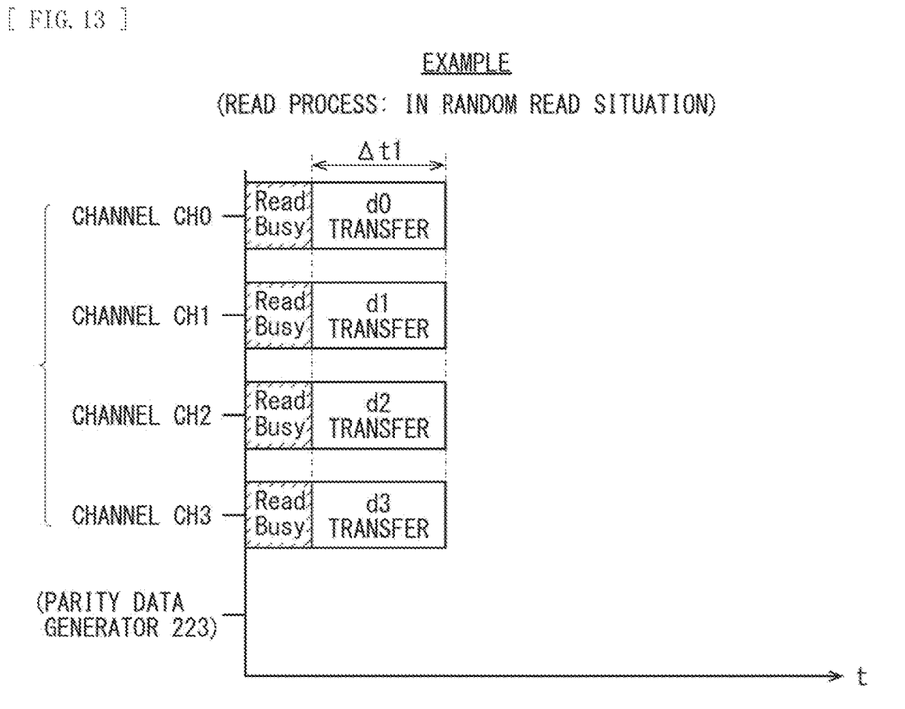
FIG. 13 is a schematic diagram illustrating an operation example of parallel data transfer during the read process (in a random read situation) according to Example.

The access processor 224 performs access processing (the write processing or read processing described above) for data on the flash memory 1. Further, the access processor 224 performs parallel data transfer to and from the flash memory 1 using the data placement for the multiple channels set by the layout setter 222 described above. Details of the write processing (the write process) and the read processing (the read process) to be performed by the access processor 224 will be described later (FIGS. 12 to 14).

The read checker 225 determines, regarding data read by the access processor 224, whether or not the data (user data) has been properly read. Specifically, the read checker 225 first reads each of data and an error-correcting code corresponding thereto in page units from a block. For example, in a case where there is no error in the data for all the pages, or in a case where there is any error in the data but the error is correctable with use of the error-correcting code, the read checker 225 determines that the data has been properly read. In contrast, for example, in a case where there is any error in the data and where the error is not correctable with use of the error-correcting code, the read checker 225 determines that the data has not been properly read.

The recoverer 226 performs recovery processing for data on the basis of the data (user data) read by the access processor 224 and parity data read further. Specifically, the recoverer 226 recovers data (user data) that has not been properly read, in units managed by redundant arrays of inexpensive disks (RAID).

[Data Placement Configuration]

Next, with reference to FIG. 3, a detailed description will be given of a configuration example of data placement in each channel to be set by the layout setter 222 described above. FIG. 3 schematically illustrates a configuration example of data placement in each channel according to Example of the present example embodiment.

Figure 4:
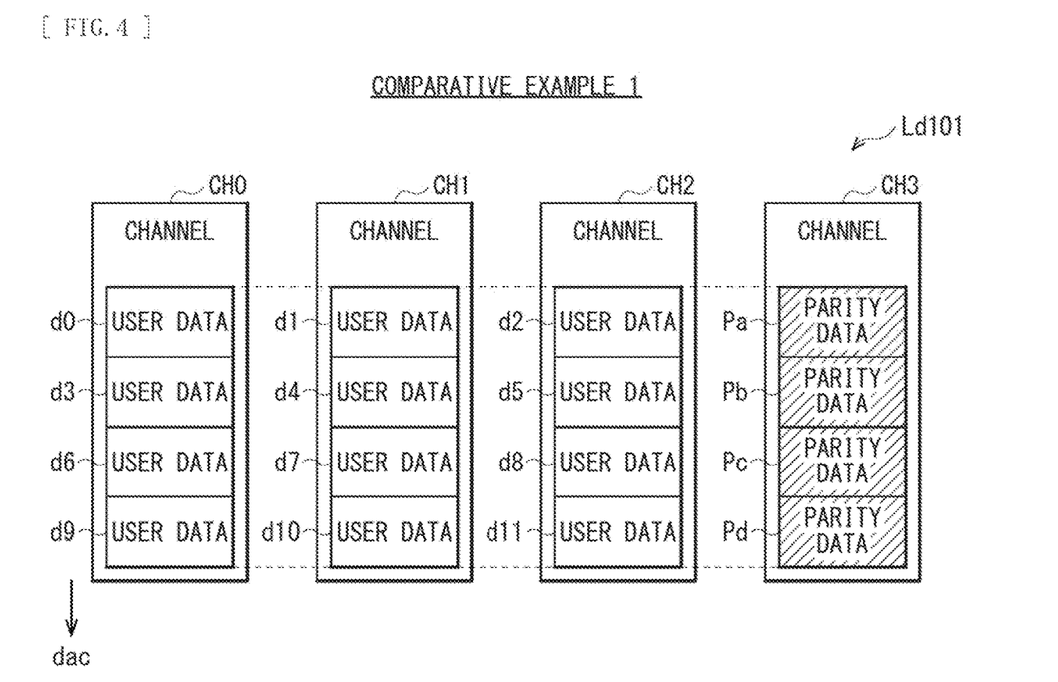
FIG. 4 is a schematic diagram illustrating a configuration example of data placement in each channel according to Comparative Example 1.
Figure 5:
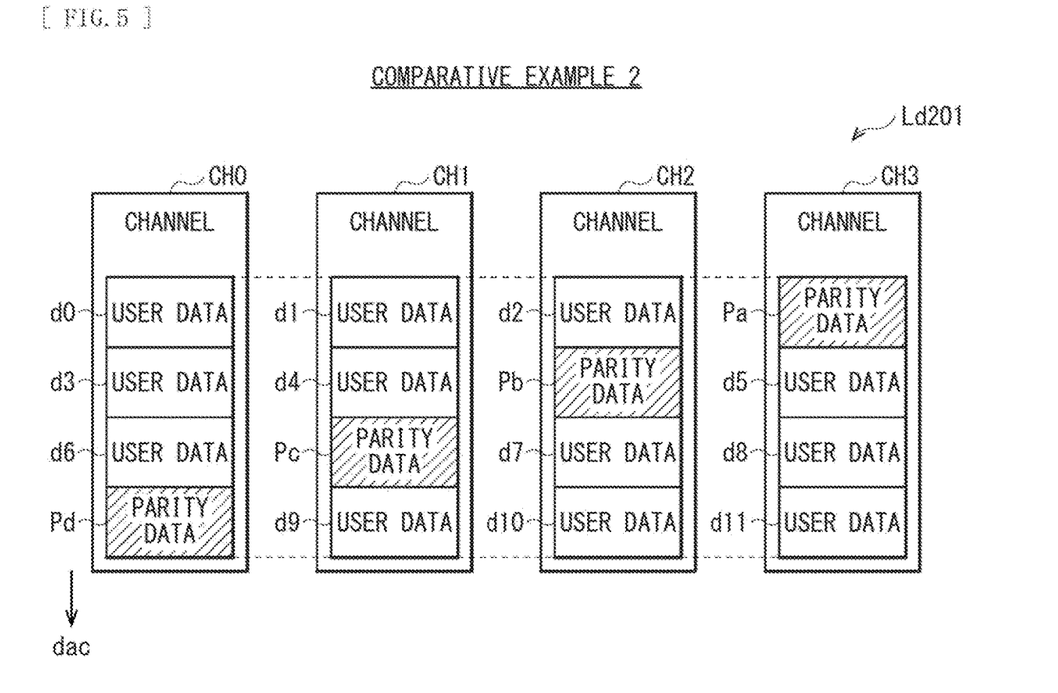
FIG. 5 is a schematic diagram illustrating a configuration example of data placement in each channel according to Comparative Example 2.

In this example of FIG. 3, four channels CH0 to CH3 are provided as the multiple channels described above. Further, in this example of FIG. 3, pieces of data (user data and parity data) each corresponding to one page are placed in each of the channels CH0 to CH3 along an order of access dac in which the pieces of data are accessed at the time of the parallel data transfer described above. These apply also to cases of comparative examples (Comparative Examples 1 and 2) to be described later (FIGS. 4 and 5).

First, according to Example illustrated in FIG. 3, the layout setter 222 performs setting of data placement Ld in the following manner, in placing each of user data (user data d0 to d11) and parity data (parity data Pa to Pd) included in data. That is, the layout setter 222 performs setting of the data placement Ld in the following manner for the channels CH0 to CH3 with regard to data placement regions Ad and parity placement regions Ap. Each of the data placement regions Ad is a region where corresponding one of the user data d0 to d11 is to be placed, and each of the parity placement regions Ap is a region where corresponding one of the parity data Pa to Pd is to be placed. Specifically, the layout setter 222 sets the data placement Ld for the channels CH0 to CH3 to allow the parity placement regions Ap to be collectively (concentratedly) placed forward or backward relative to the data placement regions Ad along the order of access dac described above.

Further, in this example of FIG. 3, in particular, the layout setter 222 sets the data placement Ld for the channels CH0 to CH3 to allow, in the channels CH0 to CH3, the parity placement regions Ap to be collectively placed backward relative to the data placement regions Ad along the order of access dac. In other words, according to the data placement Ld in FIG. 3, the data placement regions Ad are placed forward whereas the parity placement regions Ap are placed backward along the order of access dac in all the channels CH0 to CH3.

Specifically, as illustrated in FIG. 3, in the channel CH0, individual data are placed in the order of the user data d0, the user data d4, the user data d8, and the parity data Pa along the order of access dac, i.e., from front to back. In the channel CH1, individual data are placed in the order of the user data d1, the user data d5, the user data d9, and the parity data Pb along the order of access dac. In the channel CH2, individual data are placed in the order of the user data d2, the user data d6, the user data d10, and the parity data Pc along the order of access dac. In the channel CH3, individual data are placed in the order of the user data d3, the user data d7, the user data d11, and the parity data Pd along the order of access dac.

Further, in the example of FIG. 3, the parity data generator 223 generates the individual parity data Pa to Pd on the basis of the user data d0 to d11 using the following respective generation expressions, for example. Note that the symbol "+" below may represent, for example, the XOR computation described above, or may represent the Galois field computation or any other computation. This applies also to the cases of the comparative examples (Comparative Examples 1 and 2) to be described later (FIGS. 4 and 5).

$$Pa=d9+d10+d11$$

$$Pb=d6+d7+d8$$

$$Pc=d3+d4+d5$$

$$Pd=d0+d1+d2$$

The data placement regions Ad described above correspond to a specific example of "first placement regions" in one embodiment of the disclosure. The parity placement regions Ap described above correspond to a specific example of "second placement regions" in one embodiment of the disclosure.

[Operations, Workings, and Effects]

Next, a detailed description will be given of operation examples (examples of operation during the read process and the write process as the foregoing access processing for data) of the flash memory system 3 of the present example embodiment in comparison with the comparative examples (Comparative Examples 1 and 2). Comparative Examples 1 and 2 described below correspond to respective examples where so-called "RAID 4 and RAID 5" are applied.

(A. Data Placement Configurations in Comparative Examples 1 and 2)

FIG. 4 schematically illustrates a configuration example of data placement in each channel according to Comparative Example 1 (the "RAID 4" described above). FIG. 5 schematically illustrates a configuration example of data placement in each channel according to Comparative Example 2 (the "RAID 5" described above).

First, data placement Ld101 of Comparative Example 1 illustrated in FIG. 4 is set as follows, unlike the data placement Ld of Example illustrated in FIG. 3. That is, according to the data placement Ld101, only the user data d0 to d11 are placed in the channels CH0 to CH2, whereas only the parity data Pa to Pd are placed in the channel CH3.

Specifically, as illustrated in FIG. 4, in the channel CH0, individual data are placed in the order of the user data d0, d3, d6, and d9 along the order of access dac, i.e., from front to back. In the channel CH1, individual data are placed in the order of the user data d1, d4, d7, and d10 along the order of access dac. In the channel CH2, individual data are placed in the order of the user data d2, d5, d8, and d11 along the order of access dac. In the channel CH3, individual data are placed in the order of the parity data Pa, Pb, Pc, and Pd along the order of access dac.

In contrast, data placement Ld201 of Comparative Example 2 illustrated in FIG. 5 is set as follows, unlike the data placement Ld of Example illustrated in FIG. 3. That is, according to the data placement Ld201, placement regions for the user data d0 to d11 and placement regions for the parity data Pa to Pd are arranged in a mixed manner along the order of access dac in the channels CH0 to CH2, and the placement regions for the parity data Pa to Pd are not collectively (concentratedly) placed forward or backward.

Specifically, as illustrated in FIG. 5, in the channel CH0, individual data are placed in the order of the user data d0, the user data d3, the user data d6, and the parity data Pd along the order of access dac, i.e., from front to back. In the channel CH1, individual data are placed in the order of the user data d1, the user data d4, the parity data Pc, and the user data d9 along the order of access dac. In the channel CH2, individual data are placed in the order of the user data d2, the parity data Pb, the user data d7, and the user data d10 along the order of access dac. In the channel CH3, individual data are placed in the order of the parity data Pa, the user data d5, the user data d8, and the user data d11 along the order of access dac.

In both of Comparative Examples 1 and 2 illustrated in FIGS. 4 and 5, the individual parity data Pa to Pd are generated on the basis of the user data d0 to d11 using, for example, the following respective generation expressions, unlike in the foregoing case of Example of FIG. 3.

$$Pa=d0+d1+d2$$

$$Pb=d3+d4+d5$$

$$Pc=d6+d7+d8$$

$$Pd=d9+d10+d11$$

(B. Read Process in Comparative Examples 1 and 2)

Figure 6:
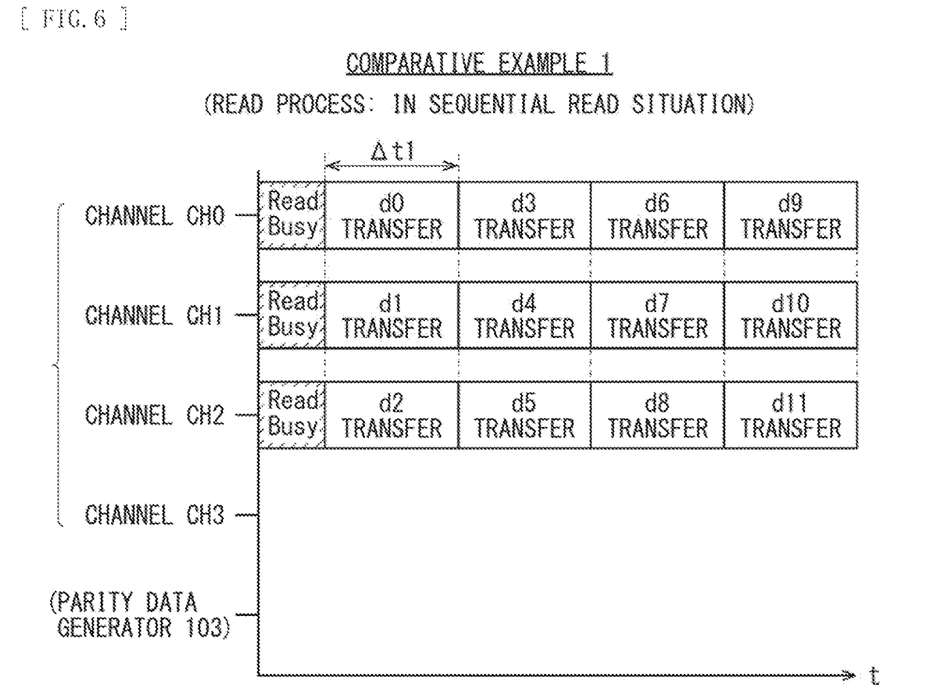
FIG. 6 is a schematic diagram illustrating an operation example of parallel data transfer during a read process (in a sequential read situation) according to Comparative Example 1.
Figure 7:
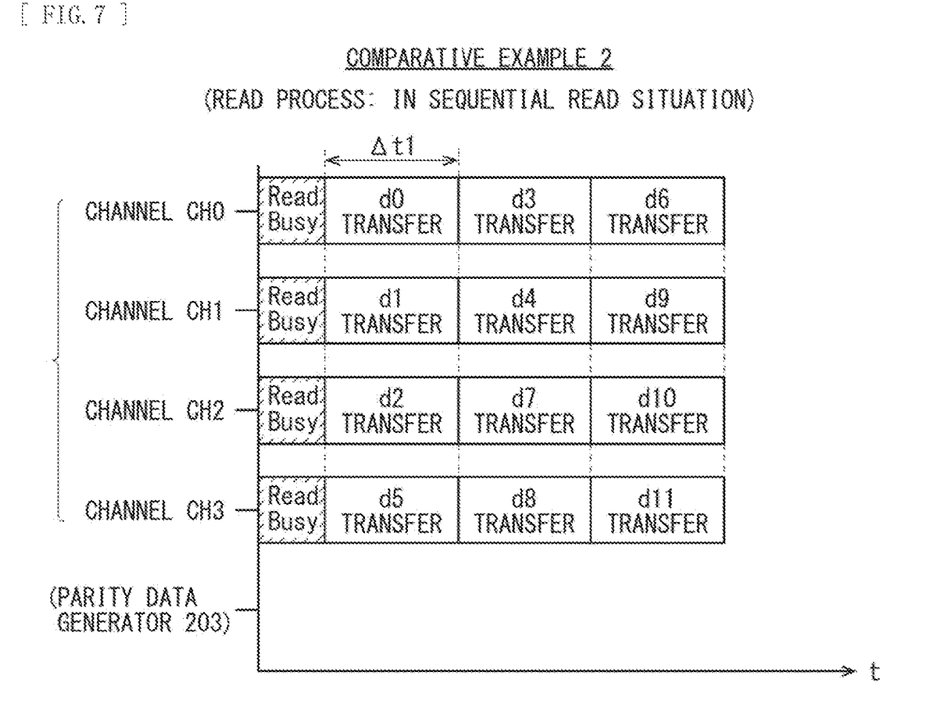
FIG. 7 is a schematic diagram illustrating an operation example of parallel data transfer during a read process (in a sequential read situation) according to Comparative Example 2.

FIG. 6 schematically illustrates an operation example of parallel data transfer during a read process (in a sequential read situation) according to Comparative Example 1. FIG. 7 schematically illustrates an operation example of parallel data transfer during a read process (in a sequential read situation) according to Comparative Example 2. In these examples of sequential read situations, the user data d0 to d11 are sequentially read along the order of access dac described above. This applies also to a case of Example to be described later (FIG. 12).

Figure 8:
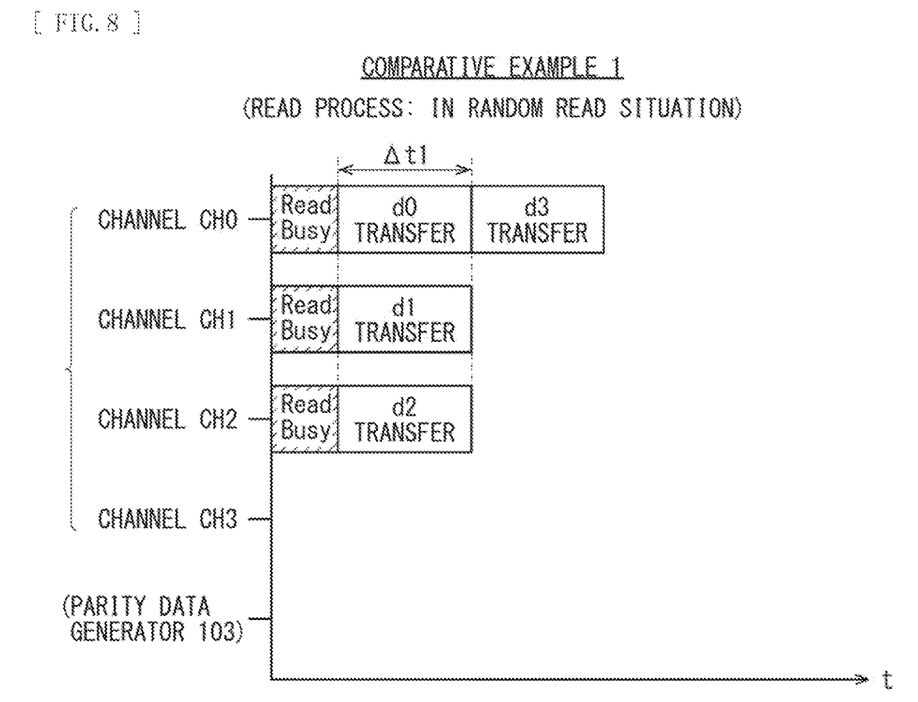
FIG. 8 is a schematic diagram illustrating an operation example of parallel data transfer during the read process (in a random read situation) according to Comparative Example 1.
Figure 9:
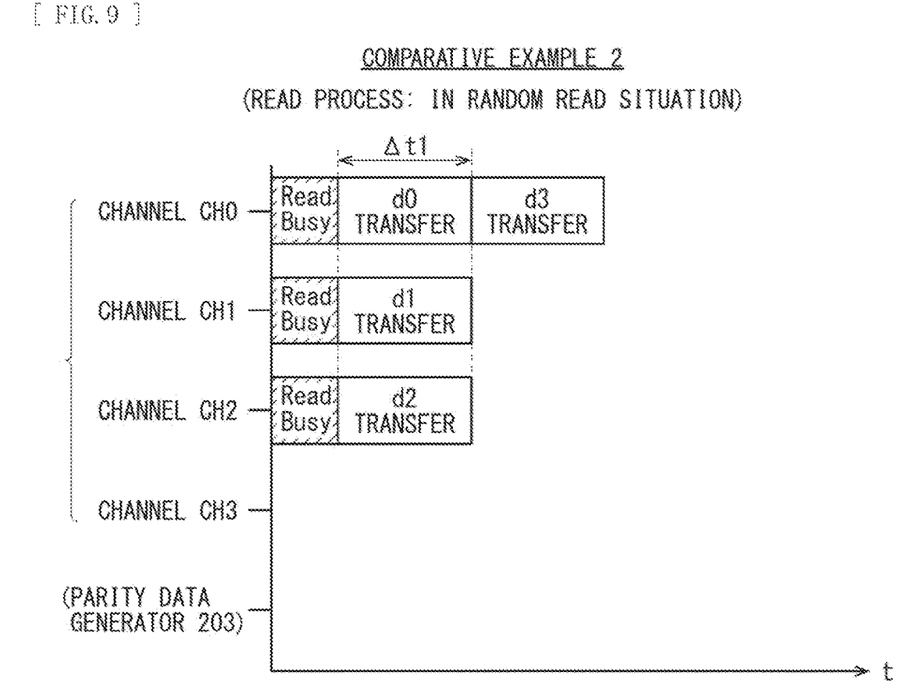
FIG. 9 is a schematic diagram illustrating an operation example of parallel data transfer during the read process (in a random read situation) according to Comparative Example 2.

FIG. 8 schematically illustrates an operation example of parallel data transfer during the read process (in a random read situation) according to Comparative Example 1. FIG. 9 schematically illustrates an operation example of parallel data transfer during the read process (in a random read situation) according to Comparative Example 2. In these examples of random read situations, only the user data d0 to d3 among the user data d0 to d11 are sequentially read along the order of access dac described above. This applies also to the case of Example to be described later (FIG. 13).

In each of FIGS. 6 to 9, the horizontal axis represents time t, and a unit period for the read process is denoted as Δt1. In addition, "Read Busy" in each of FIGS. 6 to 9 denotes a period of read preparation in the flash memory 1 for the read process. Further, during the read processes illustrated in FIGS. 6 to 9, no parity data is generated by parity data generators (a parity data generator 103 of Comparative Example 1 and a parity data generator 203 of Comparative Example 2) illustrated in these figures. These apply also to the case of Example to be described later (FIGS. 12 and 13).

First, in the sequential read situation in Comparative Example 1 illustrated in FIG. 6, in view of the data placement Ld101 of Comparative Example 1 illustrated in FIG. 4, the following will result because the channel CH3 among the four channels CH0 to CH3 is occupied by the parity data Pa to Pd. That is, according to Comparative Example 1, the parallel data transfer is substantially a three-parallel data transfer using the three channels CH0 to CH2, which results in low data transfer speed during the read process. Specifically, in the case of Comparative Example 1 illustrated in FIG. 6, a data transfer time (excluding the preparation period described above) during the read process is expressed as (4×Δt1), using the above-described unit period Δt1 for the read process.

In contrast, in the sequential read situation in Comparative Example 2 illustrated in FIG. 7, in view of the data placement Ld201 of Comparative Example 2 illustrated in FIG. 5, the following will result because the parity data Pa to Pd are distributed among the four channels CH0 to CH3, as with the data placement Ld of Example illustrated in FIG. 3. That is, according to Comparative Example 2, the parallel data transfer is a four-parallel data transfer using the four channels CH0 to CH3 as in the case of Example (FIG. 12) to be described later. This makes the data transfer speed during the read process higher than that in Comparative Example 1 described above. Specifically, in the case of Comparative Example 2 illustrated in FIG. 7, the data transfer time (excluding the preparation period described above) during the read process is expressed as (3×Δt1).

However, in the random read situations illustrated in FIGS. 8 and 9, in a case where only the user data d0 to d3 are intended to be read, the channel CH3 is occupied by the parity data Pa also in Comparative Example 2, as with Comparative Example 1, in view of the data placement Ld101 and the data placement Ld201. Thus, according to both of Comparative Examples 1 and 2, the data transfer in such random read situations is the above-described three-parallel data transfer, which results in low data transfer speed during the read process. Specifically, in the case of Comparative Examples 1 and 2 illustrated in FIGS. 8 and 9, the data transfer time (excluding the preparation period described above) during the read process is expressed as (2×Δt1).

Further, according to the data placement Ld201 of Comparative Example 2, as described above, the placement regions for the user data d0 to d11 and the placement regions for the parity data Pa to Pd are arranged in a mixed manner along the order of access dac (see FIG. 5). Accordingly, Comparative Example 2 involves a complicated technique to control the data transfer during the read process.

(C. Write Process in Comparative Examples 1 and 2)

Figure 10:
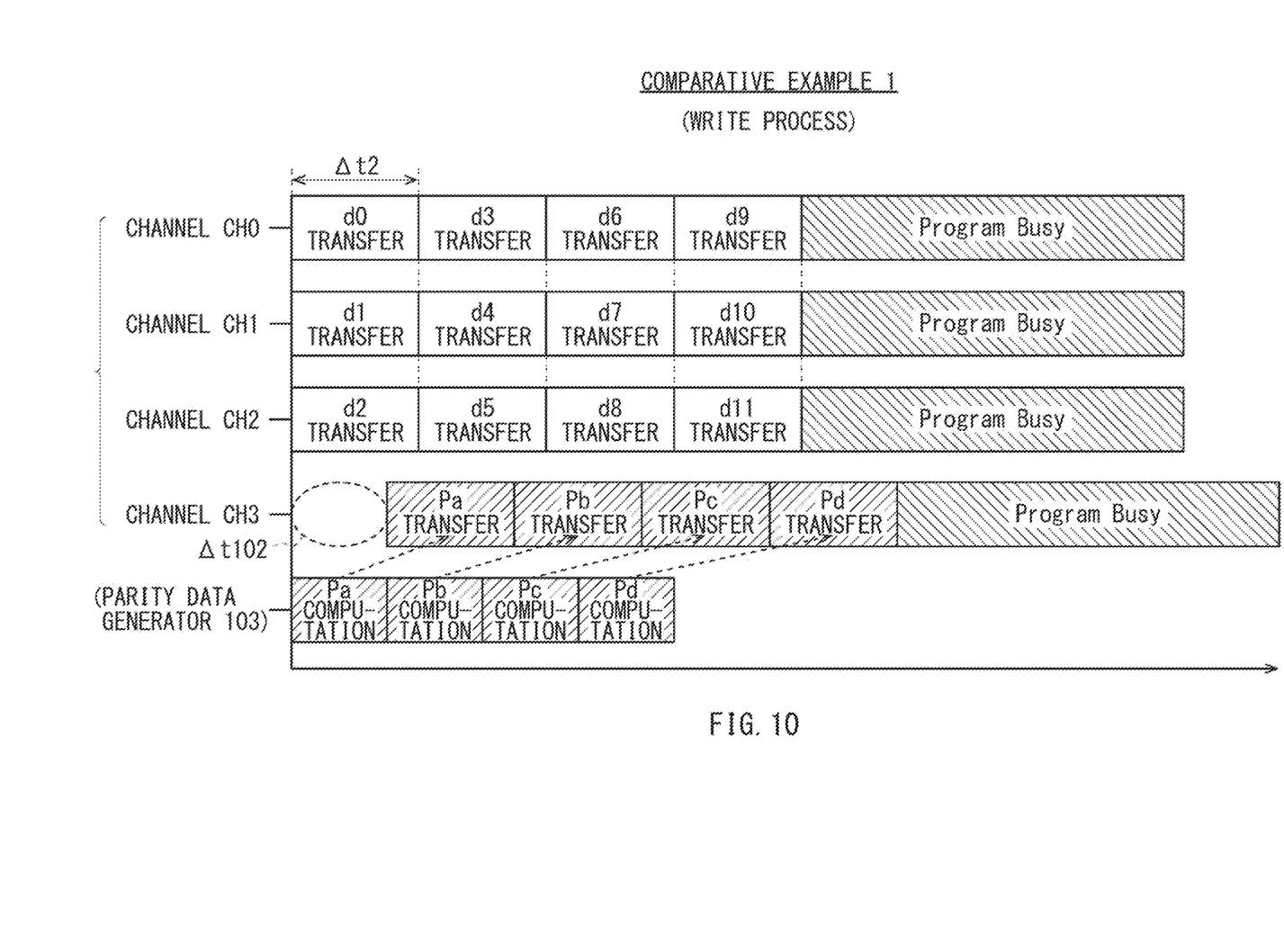
FIG. 10 is a schematic diagram illustrating an operation example of parallel data transfer during a write process according to Comparative Example 1.
Figure 11:
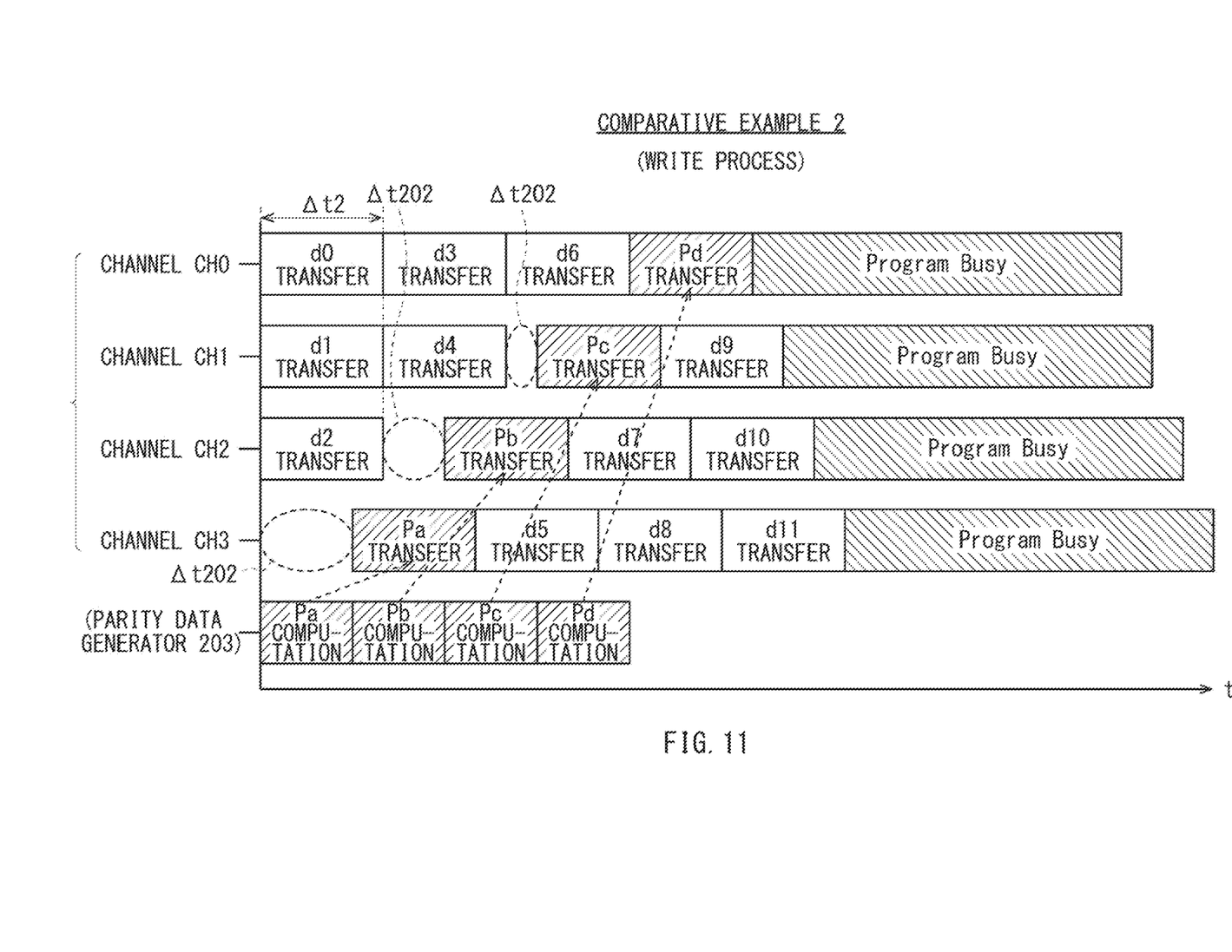
FIG. 11 is a schematic diagram illustrating an operation example of parallel data transfer during a write process according to Comparative Example 2.

Next, FIG. 10 schematically illustrates an operation example of parallel data transfer during a write process according to Comparative Example 1. FIG. 11 schematically illustrates an operation example of parallel data transfer during a write process according to Comparative Example 2.

In these examples of write process, the user data d0 to d11 are sequentially written along the order of access dac described above. In each of FIGS. 10 and 11, the horizontal axis represents time t, and a unit period for the write process is denoted as Δt2. In addition, "Program Busy" in each of FIGS. 10 and 11 denotes a period of program processing in the flash memory 1 for the write process. These apply also to the case of Example to be described later (FIG. 14).

First, during the write process in Comparative Example 1 illustrated in FIG. 10, in view of the data placement Ld101 of Comparative Example 1 illustrated in FIG. 4, parallel data transfers through the individual channels CH0 to CH3 are performed sequentially along the order of access dac described above in the following manner. That is, through the channel CH0, the data are transferred in the order of the user data d0, d3, d6, and d9; through the channel CH1, the data are transferred in the order of the user data d1, d4, d7, and d10, and through the channel CH2, the data are transferred in the order of the user data d2, d5, d8, and d11. Further, through the channel CH3, the data are transferred in the order of the parity data Pa, Pb, Pc, and Pd.

Note that during the write process in Comparative Example 1, unlike during the read process described above, generation processing for the individual parity data Pa to Pd is performed by the parity data generator 103 according to Comparative Example 1. Accordingly, as indicated by broken-line arrows in FIG. 10, for example, the individual parity data Pa to Pd are sequentially transferred after being generated. As a result, during the write process in Comparative Example 1, a standby period Δt102 (see a broken-line period in FIG. 10) occurs in the channel CH3 before a transfer period for the parity data Pa to Pd.

In contrast, during the write process in Comparative Example 2 illustrated in FIG. 11, in view of the data placement Ld201 of Comparative Example 2 illustrated in FIG. 5, parallel data transfers through the individual channels CH0 to CH3 are performed sequentially along the order of access dac described above in the following manner. That is, through the channel CH0, the data are transferred in the order of the user data do, the user data d3, the user data d6, and the parity data Pd. Through the channel CH1, the data are transferred in the order of the user data d1, the user data d4, the parity data Pc, and the user data d9. Through the channel CH2, the data are transferred in the order of the user data d2, the parity data Pb, the user data d7, and the user data d10. Through the channel CH3, the data are transferred in the order of the parity data Pa, the user data d5, the user data d8, and the user data d11.

Note that during the write process in Comparative Example 2 also, unlike during the read process described above, the generation processing for the individual parity data Pa to Pd is performed by the parity data generator 203 according to Comparative Example 2. Accordingly, as indicated by broken-line arrows in FIG. 11, for example, the individual parity data Pa to Pd are sequentially transferred after being generated. As a result, during the write process in Comparative Example 2, standby periods Δt202 (see broken-line periods in FIG. 11) occur in the channels CH1 to CH3 before respective transfer periods for the parity data Pa to Pc. Specifically, in the channel CH1, the standby period Δt202 occurs between a transfer period for the user data d4 and the transfer period for the parity data Pc. In the channel CH2, the standby period Δt202 occurs between a transfer period for the user data d2 and the transfer period for the parity data Pb. In the channel CH3, the standby period Δt202 occurs before the transfer period for the parity data Pa.

For these reasons, during the write process in both of Comparative Examples 1 and 2, reduction in the data transfer speed occurs due to generation periods for the parity data.

Thus, according to the techniques of Comparative Examples 1 and 2, it may be difficult to enhance the data transfer speed with a simple configuration in performing the read process and the write process for data.

(D. Operation Example of Present Example Embodiment)

To cope with this, according to the flash memory system 3 of the present example embodiment, the memory controller 2 performs the read process and the write process for data using the data placement Ld illustrated in FIG. 3, for example.

Specifically, first, in placing each of the user data and the parity data included in data, the layout setter 222 performs setting of the data placement Ld in the following manner for each of the multiple channels. That is, the layout setter 222 sets the data placement Ld for the channels to allow the parity placement regions Ap to be collectively placed forward or backward relative to the data placement regions Ad along the order of access dac at the time of the parallel data transfer (see FIG. 3, for example). In the example of FIG. 3, in particular, the layout setter 222 sets the data placement Ld to allow the parity placement regions Ap to be collectively placed backward relative to the data placement regions Ad along the order of access dac in the channels CH0 to CH3.

Further, in performing the read process or write process for data, the access processor 224 performs parallel data transfer along the order of access dac for respective pieces of the user data in the data placement regions Ad and respective pieces of the parity data in the parity placement regions Ap in accordance with the data placement Ld set in the above-described manner. A detailed description will be given below of the read process and the write process according to the present example embodiment, with reference to the case of the data placement Ld of Example in FIG. 3 described above.

(D-1. Read Process in Example)

FIG. 12 schematically illustrates an operation example of parallel data transfer during a read process (in a sequential read situation) according to Example. FIG. 13 schematically illustrates an operation example of parallel data transfer during the read process (in a random read situation) according to Example.

First, in the sequential read situation in Example illustrated in FIG. 12, in view of the data placement Ld of Example described above, the following will result because the parity data Pa to Pd are distributed among the four channels CH0 to CH3, as with the data placement Ld201 of Comparative Example 2 (FIG. 5) described above. That is, in this Example, the parallel data transfer is the four-parallel data transfer using the four channels CH0 to CH3 as in the case of Comparative Example 2 (FIG. 7). This makes the data transfer speed during the read process higher than in the case of Comparative Example 1 (FIG. 6: three-parallel data transfer) described above. Specifically, in the case of Comparative Example 1 illustrated in FIG. 6, the data transfer time (excluding the preparation period described above) during the read process is expressed as (4×Δt1), using the above-described unit period Δt1 for the read process. In contrast, in the case of Example illustrated in FIG. 12, as with the case of Comparative Example 2 described above (FIG. 7), the data transfer time (excluding the preparation period described above) during the read process is (3×Δt1).

In the random read situation in Example illustrated in FIG. 13, in view of the data placement Ld of Example, the following will result even in the case where only the user data d0 to d3 are intended to be read, unlike in the above-described cases of Comparative Examples 1 and 2 (FIGS. 8 and 9). That is, in this Example, unlike in the cases of Comparative Examples 1 and 2, none of the channels CH0 to CH3 is occupied by the parity data even in the random read situation. Accordingly, in this Example, the parallel data transfer is the four-parallel data transfer even in the random read situation, unlike in the cases of Comparative Examples 1 and 2 (the three-parallel data transfer). This makes the data transfer speed during the read process higher than in the cases of Comparative Examples 1 and 2. Specifically, in the cases of Comparative Examples 1 and 2 illustrated in FIGS. 8 and 9, the data transfer time (excluding the preparation period described above) during the read process is expressed as (2×Δt1). In contrast, in the case of this Example illustrated in FIG. 13, the data transfer time (excluding the preparation period described above) during the read process is (1×Δt1).

Further, the data placement Ld of this Example is not in a configuration in which the placement regions for the user data d0 to d11 and the placement regions for the parity data Pa to Pd are arranged in a mixed manner along the order of access dac as in the data placement Ld201 of Comparative Example 2, for example. In other words, according to the data placement Ld of this Example, the parity placement regions Ap are collectively placed forward or backward relative to the data placement regions Ad along the order of access dac, as described above. Accordingly, in this Example, unlike in Comparative Example 2, the data transfer during the read process is controllable with a simple technique (a technique simpler than that in Comparative Example 2).

(D-2. Write Process in Example)

FIG. 14 schematically illustrates an operation example of parallel data transfer during a write process according to Example.

During the write process in Example illustrated in FIG. 14, in view of the data placement Ld of Example, parallel data transfers through the individual channels CH0 to CH3 are performed sequentially along the order of access dac described above in the following manner. That is, through the channel CH0, the data are transferred in the order of the user data do, the user data d4, the user data d8, and the parity data Pa; and through the channel CH1, the data are transferred in the order of the user data d1, the user data d5, the user data d9, and the parity data Pb. Through the channel CH2, the data are transferred in the order of the user data d2, the user data d6, the user data d10, and the parity data Pc; and through the channel CH3, the data are transferred in the order of the user data d3, the user data d7, the user data d11, and the parity data Pd.

Further, during the write process in Example illustrated in FIG. 14, the parity data generator 223 generates the parity data Pa to Pd belonging to the respective channels CH0 to CH3 in the following manner. That is, the parity data generator 223 generates each of the parity data Pa to Pd in parallel with the parallel data transfer period for the user data d0 to d11 that is set to precede the parallel data transfer period for the parity data Pa to Pd. In other words, the generation processing for each of the parity data Pa to Pd is performed in parallel with the data transfer period for the user data d0 to d11 in the data placement regions Ad that are collectively placed forward relative to the parity placement regions Ap.

Accordingly, during the write process in this Example, no standby period occurs in any of the channels CH0 to CH3, unlike in the cases of the write process in Comparative Examples 1 and 2 described above (FIGS. 10 and 11). Thus, as illustrated in FIG. 14, for example, corresponding ones of the user data d0 to d11 and corresponding one of the parity data Pa to Pd are seamlessly subjected to data transfer through each of the channels CH0 to CH3. As a result, reduction in the data transfer speed caused by the generation periods for the parity data described above is avoided in this Example, unlike in the cases of Comparative Examples 1 and 2. In other words, the data transfer speed during the write process is enhanced in this Example, as compared with the cases of the Comparative Examples 1 and 2.

(E. Workings and Effects)

As described above, according to the present example embodiment, setting of the data placement is performed for each of the multiple channels as follows, in placing each of the user data and the parity data included in data. That is, the data placement is set for the channels to allow the foregoing parity placement regions Ap to be collectively placed forward or backward relative to the foregoing data placement regions Ad along the order of access dac at the time of the parallel data transfer.

Thus, according to the present example embodiment, the following operation is performed in performing the access processing (the read process and the write process described above) for data. That is, as described above, the parallel data transfer along the order of access dac is performed for the respective pieces of the user data in the data placement regions Ad and the respective pieces of the parity data in the parity placement regions Ap in accordance with the data placement that is set for each of the multiple channels. As a result, according to the present example embodiment, it is possible to avoid reduction in the data transfer speed during the read process and the write process with a simple technique, unlike in Comparative Examples 1 and 2, for example, described above. For these reasons, the present example embodiment makes it possible to enhance the data transfer speed with a simple configuration, as compared with Comparative Examples 1 and 2, for example.

In addition, in the present example embodiment, in particular, the parity placement regions Ap are collectively placed backward relative to the data placement regions Ad along the order of access dac in the multiple channels. Accordingly, unlike in the foregoing case of Comparative Examples 1 and 2, for example, it is possible to avoid reduction in the data transfer speed caused by the parity data generation periods during the write process for data. As a result, the present example embodiment allows easier enhancement of the data transfer speed during the write process, as compared with Comparative Examples 1 and 2, for example.

Specifically, according to the present example embodiment, as described above, when the write process is performed, respective pieces of the parity data belonging to the multiple channels are each generated in parallel with the parallel data transfer period for the user data that is set to precede the parallel data transfer period for the parity data. Accordingly, the present example embodiment makes it easier to avoid the above-described reduction in the data transfer speed caused by the parity data generation period. As a result, the present example embodiment allows further easier enhancement of the data transfer speed during the write process, as compared with Comparative Examples 1 and 2, for example.

2. Modification Examples

Although the disclosure has been described above with reference to the example embodiment, the disclosure is not limited to such an example embodiment, and may be modified in a variety of ways.

For example, although the description has been given specifically of the respective configurations of the host system, the flash memory, the memory controller, and the control circuit in the foregoing example embodiment, their respective configurations are not limited to those described in the foregoing example embodiment. Specifically, an example case where the flash memory 1 is a NAND flash memory has been described in the foregoing example embodiment, for example. However, this is a non-limiting example, and a NOR flash memory may be used as the flash memory 1, for example.

Further, in the foregoing example embodiment, the description has been given of an example case where the parity placement regions Ap are collectively placed backward relative to the data placement regions Ad along the order of access dac in the multiple channels. However, setting examples of the data placement for the channels include not only such an example but also the opposite placement, that is, the parity placement regions Ap may be collectively placed forward relative to the data placement regions Ad along the order of access dac in the multiple channels. Further, a configuration employable for data placement in the channels, including the number of channels, the number and amount of data in each channel, the order of placement, and the like is not limited to the example described in the foregoing example embodiment, and any of other configurations may be chosen.

Moreover, in the foregoing example embodiment, the description has specifically been given of examples including a setting example of data placement for each channel by the layout setter 222, an example of access processing (the read process and the write process) for data performed by the access processor 224, and an example of technique by which the parity data generator 223 generates the parity data. However, such various processing examples are not limited to those described in the foregoing example embodiment, and any of other techniques may be used to perform these various processing examples.

In addition, any two or more of the configuration examples, operation examples, and other examples described so far may be combined and applied in a desired manner.

Embodiments of the disclosure may be configured as follows.

(1)

A memory controller configured to control a flash memory, the memory controller including:

a layout setter configured to perform setting of data placement that is to be applied to multiple channels at the time of parallel data transfer to be performed between the memory controller and the flash memory using the multiple channels; and an access processor configured to perform, in performing access processing for data on the flash memory, the parallel data transfer to and from the flash memory using the data placement for the multiple channels that is set by the layout setter, in which the layout setter is configured to, in placing each of user data and parity data included in the data, set the data placement for the multiple channels to allow, in the multiple channels, second placement regions to be collectively placed forward or backward relative to first placement regions along an order of access at the time of the parallel data transfer, the first placement regions each being a region where the user data is to be placed, the second placement regions each being a region where the parity data is to be placed.

(2)

The memory controller according to (1), in which the layout setter is configured to set the data placement for the multiple channels to allow, in the multiple channels, the second placement regions to be collectively placed backward relative to the first placement regions along the order of access.

(3)

The memory controller according to (2), further including a parity data generator configured to generate the parity data on the basis of the user data, in which
  the parity data generator is configured to, when write processing for the data is performed as the access processing, generate respective pieces of the parity data belonging to the multiple channels, in parallel with a period of the parallel data transfer for the user data that is set to precede a period of the parallel data transfer for the parity data.

(4)

The memory controller according to any one of (1) to (3), in which the access processor is configured to, in performing read processing or write processing for the data as the access processing, perform the parallel data transfer for respective pieces of the user data in the first placement regions and respective pieces of the parity data in the second placement regions along the order of access, in accordance with the data placement that is set for each of the multiple channels.

(5)

A flash memory system including:
  the memory controller according to any one of (1) to (4); and
  the flash memory.

(6)

A memory controller configured to control a flash memory, the memory controller including
  a control circuit configured to:
    perform setting of data placement that is to be applied to multiple channels at the time of parallel data transfer to be performed between the memory controller and the flash memory using the multiple channels; and
    perform, in performing access processing for data on the flash memory, the parallel data transfer to and from the flash memory using the data placement for the multiple channels that is set by the control circuit,
  in which
    the control circuit is configured to, in placing each of user data and parity data included in the data, set the data placement for the multiple channels to allow, in the multiple channels, second placement regions to be collectively placed forward or backward relative to first placement regions along an order of access at the time of the parallel data transfer, the first placement regions each being a region where the user data is to be placed, the second placement regions each being a region where the parity data is to be placed.

(7)

The memory controller according to (6), in which the control circuit is configured to set the data placement for the multiple channels to allow, in the multiple channels, the second placement regions to be collectively placed backward relative to the first placement regions along the order of access.

(8)

The memory controller according to (7), in which
  the control circuit is further configured to generate the parity data on the basis of the user data, and
  the control circuit is configured to, in performing write processing for the data as the access processing, generate respective pieces of the parity data belonging to the multiple channels, in parallel with a period of the parallel data transfer for the user data that is set to precede a period of the parallel data transfer for the parity data.

(9)

The memory controller according to any one of (6) to (8), in which the control circuit is configured to, in performing read processing or write processing for the data as the access processing, perform the parallel data transfer for respective pieces of the user data in the first placement regions and respective pieces of the parity data in the second placement regions along the order of access, in accordance with the data placement that is set for each of the multiple channels.

(10)

A flash memory system including:
  the memory controller according to any one of (6) to (9); and
  the flash memory.

The memory controller according to at least one embodiment of the disclosure and the flash memory system according to at least one embodiment of the disclosure each make it possible to enhance data transfer speed with a simple configuration.

The invention claimed is:

1. A memory controller configured to control a flash memory, the memory controller comprising:
  a layout setter configured to perform setting of data placement that is to be applied to multiple channels at time of parallel data transfer to be performed between the memory controller and the flash memory using the multiple channels; and
  an access processor configured to perform, in performing access processing for data on the flash memory, the parallel data transfer to and from the flash memory using the data placement for the multiple channels that is set by the layout setter, wherein
  the layout setter is configured to, in placing each of user data and parity data included in the data, set the data placement for the multiple channels to allow, in the multiple channels, second placement regions to be collectively placed only forward or only backward relative to first placement regions along an order of access at the time of the parallel data transfer, the first placement regions each being a region where the user data is to be placed, the second placement regions each being a region where the parity data is to be placed.

2. The memory controller according to claim 1, further comprising a parity data generator configured to generate the parity data on a basis of the user data, wherein
  the parity data generator is configured to, when write processing for the data is performed as the access processing, generate respective pieces of the parity data belonging to the multiple channels, in parallel with a period of the parallel data transfer for the user data that is set to precede a period of the parallel data transfer for the parity data.

3. The memory controller according to claim 1, wherein the access processor is configured to, in performing read processing or write processing for the data as the access processing, perform the parallel data transfer for respective pieces of the user data in the first placement regions and respective pieces of the parity data in the second placement regions along the order of access, in accordance with the data placement that is set for each of the multiple channels.

4. A flash memory system comprising:
the memory controller according to claim 1; and
the flash memory.

5. A memory controller configured to control a flash memory, the memory controller comprising
a control circuit configured to:
  perform setting of data placement that is to be applied to multiple channels at time of parallel data transfer to be performed between the memory controller and the flash memory using the multiple channels; and
  perform, in performing access processing for data on the flash memory, the parallel data transfer to and from the flash memory using the data placement for the multiple channels that is set by the control circuit, wherein
the control circuit is configured to, in placing each of user data and parity data included in the data, set the data placement for the multiple channels to allow, in the multiple channels, second placement regions to be collectively placed only forward relative to first placement regions along an order of access at the time of the parallel data transfer, the first placement regions each being a region where the user data is to be placed, the second placement regions each being a region where the parity data is to be placed.

6. The memory controller according to claim 5, wherein
the control circuit is further configured to generate the parity data on a basis of the user data, and
the control circuit is configured to, in performing write processing for the data as the access processing, generate respective pieces of the parity data belonging to the multiple channels, in parallel with a period of the parallel data transfer for the user data that is set to precede a period of the parallel data transfer for the parity data.

7. The memory controller according to claim 5, wherein the control circuit is configured to, in performing read processing or write processing for the data as the access processing, perform the parallel data transfer for respective pieces of the user data in the first placement regions and respective pieces of the parity data in the second placement regions along the order of access, in accordance with the data placement that is set for each of the multiple channels.

8. A flash memory system comprising:
the memory controller according to claim 5; and
the flash memory.

9. A memory controller configured to control a flash memory, the memory controller comprising
a control circuit configured to:
  perform setting of data placement that is to be applied to multiple channels at time of parallel data transfer to be performed between the memory controller and the flash memory using the multiple channels; and
  perform, in performing access processing for data on the flash memory, the parallel data transfer to and from the flash memory using the data placement for the multiple channels that is set by the control circuit, wherein
the control circuit is configured to, in placing each of user data and parity data included in the data, set the data placement for the multiple channels to allow, in the multiple channels, second placement regions to be collectively placed only backward relative to first placement regions along an order of access at the time of the parallel data transfer, the first placement regions each being a region where the user data is to be placed, the second placement regions each being a region where the parity data is to be placed.

10. The memory controller according to claim 9, wherein
the control circuit is further configured to generate the parity data on a basis of the user data, and
the control circuit is configured to, in performing write processing for the data as the access processing, generate respective pieces of the parity data belonging to the multiple channels, in parallel with a period of the parallel data transfer for the user data that is set to precede a period of the parallel data transfer for the parity data.

11. The memory controller according to claim 9, wherein the control circuit is configured to, in performing read processing or write processing for the data as the access processing, perform the parallel data transfer for respective pieces of the user data in the first placement regions and respective pieces of the parity data in the second placement regions along the order of access, in accordance with the data placement that is set for each of the multiple channels.

12. A flash memory system comprising:
the memory controller according to claim 9; and
the flash memory.

* * * * *